United States Patent [19]

Bradley et al.

[11] 4,372,794
[45] Feb. 8, 1983

[54] PLASTIC PAR LAMP CONSTRUCTION

[75] Inventors: Irving Bradley, Novelty; Vincent Vodicka, South Euclid, both of Ohio

[73] Assignee: General Electric Company, Schenectady, N.Y.

[21] Appl. No.: 275,063

[22] Filed: Jun. 18, 1981

Related U.S. Application Data

[62] Division of Ser. No. 61,912, Jul. 30, 1979, Pat. No. 4,336,578.

[51] Int. Cl.³ .................... B29C 27/08; H01K 1/30
[52] U.S. Cl. .................... 156/73.1; 156/580.1; 156/580.2; 313/113; 313/318; 445/44
[58] Field of Search ............... 156/73.1, 580.1, 580.2, 156/69; 228/110, 1 R; 362/61; 313/113, 220, 318; 29/25.13

[56] References Cited

U.S. PATENT DOCUMENTS

| | | | |
|---|---|---|---|
| 3,525,454 | 8/1970 | Frederiksen | 156/73.1 |
| 3,586,122 | 6/1971 | Jacke | 228/1 |
| 3,784,807 | 1/1974 | Boekkooi et al. | 362/267 |
| 3,885,149 | 5/1975 | Wolfe et al. | 313/318 |
| 3,898,451 | 8/1975 | Murphy et al. | 313/113 |
| 4,019,045 | 4/1977 | Bassett | 362/267 |
| 4,210,841 | 7/1980 | Vodicka et al. | 313/113 |
| 4,282,565 | 8/1981 | Hanson et al. | 362/306 |
| 4,287,448 | 9/1981 | Bradley | 313/113 |
| 4,336,577 | 6/1982 | Hanson | 362/306 |
| 4,339,790 | 7/1982 | Hanson et al. | 362/306 |

*Primary Examiner*—Michael G. Wityshyn
*Attorney, Agent, or Firm*—John F. McDevitt; Philip L. Schlamp; Fred Jacob

[57] ABSTRACT

An improved plastic reflector member for a parabolic aluminized reflector (PAR) lamp is disclosed and, in particular, use of said improved plastic reflector member for an all plastic PAR lamp or a PAR lamp which uses said improved reflector member. Said improved plastic reflector member utilizes a variable thickness wall member to form the parabolic shaped cavity wherein the wall thickness is sufficiently greater in the apex region of said parabolic cavity than in the adjoining wall region to avoid mechanical and heat distortion.

4 Claims, 2 Drawing Figures

PLASTIC PAR LAMP CONSTRUCTION

This is a division, of application Ser. No. 61,912, filed July 30, 1979 and now U.S. Pat. No. 4,336,578.

RELATED PATENT APPLICATIONS

U.S. patent application Ser. No. 58,061, filed July 16, 1979, in the names of James M. Hanson and Irving Bradley, now U.S. Pat. No. 4,282,565 and assigned to the present assignee, describes a sealed prefocused plastic mount construction for a plastic PAR lamp having the same general construction disclosed herein. More particularly, said plastic block mount comprises mating parts which define a cavity for receiving the lead wires of an associated light source with said cavity being filled with an elastomeric polymer providing a leak-proof enclosure. A further leak-proof seal is provided by the means employed to join said mount construction to the lamp reflector member. Locating or reference surfaces on the mount construction and reflector member cooperate to provide accurate positioning of the light source at the focus of said reflector member.

Another U.S. patent application Ser. No. 61,910, filed concurrently herewith in the name of James M. Hanson, now U.S. Pat. No. 4,336,577 and assigned to the present assignee, describes a related rectangular shaped plastic reflector member having a parabolic shaped cavity characterized by opposing generally parallel planes which intersect the parabolic contour and terminate in an outer sealing rim. Said reflector member further utilizes mounting pads of a hollow construction to avoid deformation of the parabolic cavity when said reflector member is formed, preferably by injection molding as a unitary construction. Receptacle means are further disposed on the rear side of said reflector member to accommodate a prefocused mount construction which locates a light source at the focus of said reflector and said prefocused mount construction can have the same configuration as disclosed in said previously filed application.

BACKGROUND OF THE INVENTION

A basic advantage for an all plastic PAR lamp is its light weight as compared to the glass construction now in use. Consequently, a minimum wall thickness for said plastic PAR lamp construction is desirable to provide as little weight as possible while still recognizing that heat and mechanical distortion of the plastic material both during lamp assembly and thereafter in use can give rise to a number of serious problems. Such a problem is experienced during assembly of an all-plastic PAR lamp for an automotive headlamp construction wherein accurate positioning of the light source at the focus of the reflector member is understandably desirable. Any heat or mechanical distortion of the parabolic shaped cavity in such a reflector member can preclude accurate focusing when either ultrasonic or vibrational welding techniques are employed in joining the mount light source to the reflector member as a means of providing a leak-proof seal therebetween. Any subsequent heat distortion of the assembled construction during lamp operation at elevated temperatures can cause much the same problem with respect to continued accurate focusing of a light source in said reflector member. Consequently, a more reliable positioning means of a light source in an all plastic reflector member is desirable which permits accurate focusing of the light source both during lamp assembly as well as subsequent lamp operation.

SUMMARY OF THE INVENTION

It is therefore an important object of the present invention to provide improved positioning means of the light source in a prefocused plastic PAR lamp.

Another important object of the present invention is to provide improved positioning means for the aforementioned lamp construction requiring only modest structural modification of the now existing reflector member.

Still another important object of the present invention is to provide an improved method for assembling a prefocused light source mount to a pastic reflector member as well as thereafter assembling a lens member to said reflector and mount construction.

These and other objects of the present invention are achieved by varying the wall thickness of the parabolic shaped cavity in a rectangular shaped plastic reflector member so that the wall thickness is sufficiently greater in the apex region of said parabolic cavity than in the adjoining wall region of the member to avoid heat and mechanical distortion. In a preferred embodiment, said reflector member is of a unitary molded construction, such as obtained by injection molding, and with the increased thickness being provided in the outer surface region of said parabolic shape cavity to further avoid any optical disturbance of the light reflecting inner surface. In particular, the improved rectangular shaped plastic member of the present invention includes a parabolic shaped cavity, one pair of opposing generally parallel planes which intersect the parabolic cavity to form the longer sides of said rectangular shape, a second pair of opposing generally parallel planes which intersect the parabolic cavity to form the shorter sides of said rectangular shape, all of said planes terminating at a rectangular shaped sealing rim, and receptacle means disposed on the rear side of said reflector which accommodates a prefocused mount construction to locate a light source at the focus of said reflector, wherein the improvement consists of having the wall thickness of the parabolic shaped cavity of sufficiently greater thickness in the apex region of said parabolic cavity than in the adjoining wall region to avoid mechanical and heat distortion.

A reflector lamp of the present invention utilizing the above described plastic reflector further includes a prefocused mount which includes a light source located at the focus of said reflector being sealed to the receptacle means of said reflector and a lens member joined to the sealing rim of the reflector member. In a preferred embodiment the prefocused light source mount being employed comprises at least two lead wires, at least two electrical connecting means joined one each to said lead wires, a plastic block having mating parts defining a cavity for receiving said joined lead wires, an elastomeric polymer in the cavity of said block to provide a leak-proof seal, and a light source connected to the end of said lead wires outside of said block. Said prefocused mount and light source unit along with the means for joining said mount construction to a rectangular shaped plastic reflector member is already described in the aforementioned patent application Ser. No. 58,061, hence need only be further described in the present application to the extent of the improvements made herein.

The improved method of assembling the above described prefocused light source mount to said plastic reflector member comprises:
(a) assembling said light source mount to the receptacle means of said reflector member so that the light source is positioned at the focus of said reflector,
(b) mechanically securing the light source mount while the reflector member of said assembly is free to move, and
(c) ultrasonically vibrating the reflector member until a leak-proof seal has been formed between abutting surfaces of the light source mount and reflector member.

The present method of ultrasonically welding the assembled members differs from the conventional ultrasonic welding technique which vibrates the part having a smaller mass while permitting the part with the larger mass to remain free to move. Said conventional ultrasonic welding technique has proven unacceptable for the present lamp construction since ultrasonic vibration of the lesser mass mount and light source assembly frequently damages the light source. The present assembly method avoids this damage and can be carried out by mechanically securing the light source mount on a horizontal surface and physically supporting the reflector member on said light source mount after assembly thereto. In a further preferred method of assembling the reflector lamp after the light source mount and the reflector member have been assembled together to provide a leak-proof seal, the lens member can be joined to the sealing rim of the reflector member to provide a final leak-proof enclosure by either ultrasonic or vibration welding techniques or otherwise adhesively bonding the lens to the reflector. The preferred light source in the reflector lamp is a tungsten halogen incandescent lamp such as described in U.S. Pat. No. 4,139,794 which is assigned to the present assignee.

DESCRIPTION OF THE PREFERRED EMBODIMENTS

Figure 1:
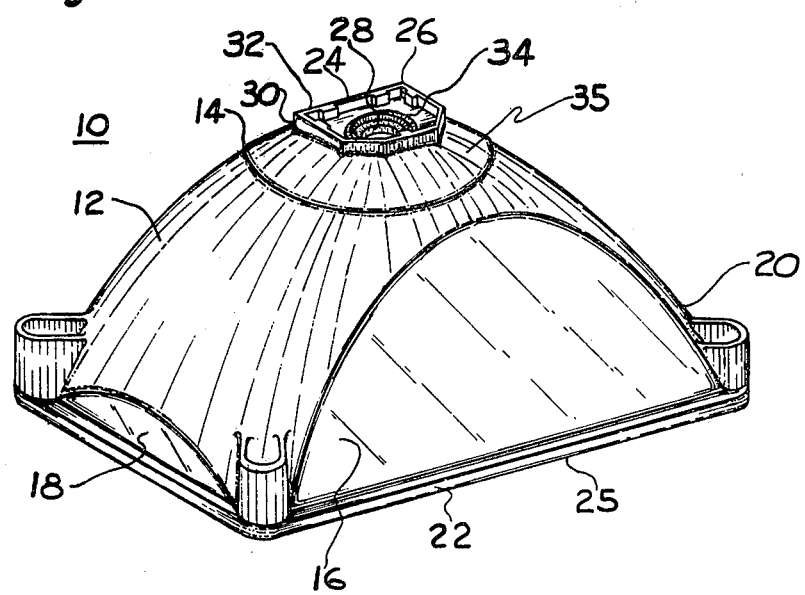
FIG. 1 is a perspective view of an improved rectangular shaped plastic reflector member constructed in accordance with the present invention.

Referring to FIG. 1, there is shown in perspective a rectangular shaped plastic reflector member 10 having a parabolic shaped cavity 12, one pair of opposing generally parallel planes 14 and 16 which intersect said parabolic cavity to form the longer side walls of said rectangular shape, a second pair of opposing generally parallel planes 18 and 20 which intersect said parabolic cavity to form the shorter sides or end walls of said rectangular shape, all of said planes terminating at a rectangular shaped sealing rim 22, and raised receptacle means 24 disposed on the rear side of said reflector to accommodate a prefocused mount construction (not shown) that locates a light source at the focus of said reflector member. A lens member (also not shown) is sealed by conventional means to the front sealing surface 25 of said sealing rim on the reflector member. As shown, said receptacle means 24 which is disposed on the rear side of said reflector member comprises a box-like enclosure 26 into which the assembled plastic block mount and light source unit is fitted and which contains a central aperture 28 through which the light source extends after joinder. Wall portions 30 of the raised receptacle means furnish a support ledge 32 which accommodates a mating surface of the assembled block mount after joinder together as hereinafter described. A circular raised wall portion 34 surrounds the central aperture opening 28 and furnishes the means to ultrasonically bond the assembled block mount to the receptacle means in a manner providing the desired leak-proof seal. An external view of the increased wall thickness 35 in the apex region of the parabolic cavity is also depicted in the drawing.

Figure 2:
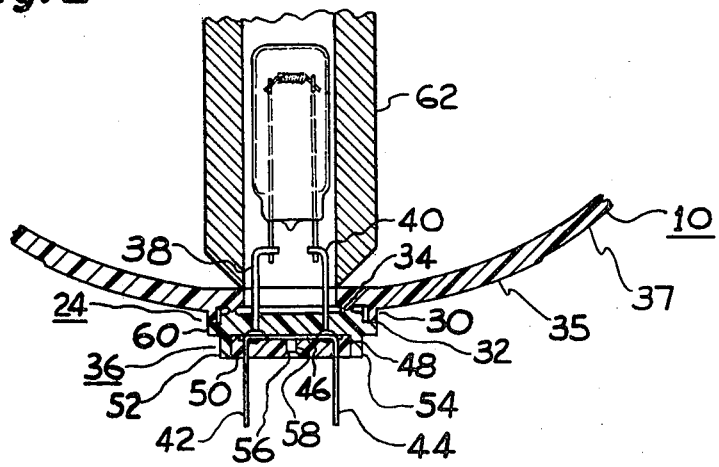
FIG. 2 is a partial cross sectional view of said reflector member which depicts the varied wall thickness of the parabolic cavity and further illustrates the improved method of the present invention for ultrasonically bonding the light source mount to the receptacle means provided on the rear side of said reflector member.

FIG. 2 depicts in cross section an already assembled preferred block mount and light source unit which has been ultrasonically bonded to the reflector member in accordance with the present invention and which further illustrates the manner in which said joining has been accomplished. Accordingly, said assembled block mount and light source unit 36 has been ultrasonically bonded to receptacle means 24 of reflector member 10. As can be noted, a pair of electrical leads 38 and 40 are joined to metal lugs 42 and 44 which reside in the enclosed cavity 46 although extending outwardly from the assembled block mount. Said cavity 46 is formed by walls 48 of an inner box-like container member 50 which fits within the walls 52 of an outer housing member 54. Aperture opening 56 of said inner container member 50 permits injection of the elastomeric polymer 58 into the enclosed cavity to provide a leak-proof seal for the assembled block mount. As can also be seen, a further leak-proof seal is created between the assembled block mount and the reflector member 10 resulting from a joinder therebetween in accordance with the method of the invention. Specifically, ultrasonic welding of the wall 34 in said receptacle means to the underside surface of the assembled block mount provides a further barrier to moisture penetration inside the reflector member which can result from exposure to ambient conditions. Said ultrasonic welding of the assembled block mount to the receptacle means of the reflector member 10 further permits lowering of the underside surface of a flange portion 60 of said block mount to rest on the surface 32 provided by outer wall 30 of the receptacle member. As can be further noted from this drawing, wall thickness 35 in the apex region of the parabolic cavity is significantly greater than exists at a point 37 in the adjoining wall region.

The present ultrasonic welding method utilizes a conventional tool or horn member 62 shown in cross section and vibrating at an ultrasonic frequency which is brought into physical contact with the reflector member 10 as shown in FIG. 2. Said reflector member is free to move although fitted into the light source mount while the latter construction is mechanically secured to a fixed support by fastening means (not shown). Thus in the preferred embodiment being illustrated, the light source mount can be mechanically secured on a horizontal surface while the reflector member is physically supported on said light source mount. When pressure is applied to the ultrasonic work tool 62, frictional heat is generated as the high frequency vibratory energy melts the plastic material on the abutting surfaces to form the desired joint. A conventional ultrasonic plastic welding apparatus can be used for this purpose such as the Branson Model 4120 unit.

It will be apparent from the foregoing description to those skilled in the art that various modifications can be made in the above described preferred embodiments which are still within the spirit and scope of the present invention. For example, a variety of elastomer polymers may be utilized providing they fulfill the condition that they adhere to both metal and plastic. Similarly, while the preferred plastic mount and light source unit has been described as having a generally rectangular shape in the form of box-like members, other suitable shapes such as cylindrical may be used providing the desired mount construction. It is also contemplated that suitable light sources include conventional incandescent lamps, tungsten halogen lamps or discharge lamps. It is intended to limit the present invention only by the scope of the following claims.

What we claim as new and desire to secure by Letters Patent of the United States is:

1. A method of assembling a prefocused light source mount to a plastic reflector member of a rectangular shaped reflector lamp, said reflector member having a parabolic cavity with one pair of opposing generally parallel sides and a second pair of shorter generally parallel sides to form said rectangular shape, receptacle means for a prefocused light source mount disposed on the rear side of said reflector member, and with said reflector member having a greater wall thickness in the apex region of said parabolic cavity in a circular area commencing at the edge of the receptacle means and extending radially outward therefrom to avoid mechanical and heat deformation when the prefocused mount is sealed to said reflector member as well as during subsequent lamp operation, which comprises:
   (a) assembling said light source mount to the receptacle means of said reflector member so that the light source is positioned at the focus of said reflector,
   (b) mechanically securing the light source mount while the reflector member of said assembly is free to move, and
   (c) ultrasonically vibrating the reflector member until a leak-proof seal has been formed between abutting surfaces of the light source mount and the reflector member.

2. A method as in claim 1 wherein the light source mount is mechanically secured on a horizontal surface and the reflector member is physically supported on said light source mount.

3. A method of assembling a rectangular shaped reflector lamp having a lens and a plastic reflector member which both include a sealing rim, said reflector member having a parabolic shaped cavity with one pair of opposing generally parallel sides and a second pair of shorter generally parallel sides to form said rectangular shape, receptacle means to position a prefocused light source mount with the light source at the focus point in said parabolic cavity being disposed on the rear side of said reflector member, and with said reflector member having a greater wall thickness in the apex region of said parabolic cavity in a circular area commencing at the edge of the receptacle means and extending radially outward therefrom to avoid mechanical and heat deformation when the prefocused mount is sealed to said reflector member as well as during subsequent lamp operation comprising:
   (a) assembling said light source mount to the receptacle means of said reflector member so that the light source is positioned at the focus of said reflector,
   (b) mechanically securing the light source mount while the reflector member of said assembly is free to move,
   (c) ultrasonically vibrating the reflector member until a leak-proof seal has been formed between abutting surfaces of the light source mount and the reflector member, and
   (d) joining the lens to the sealing rim of the reflector member.

4. A method as in claim 3 wherein the light source is a tungsten halogen lamp.

* * * * *